United States Patent
Aichriedler et al.

(10) Patent No.: US 11,720,505 B2
(45) Date of Patent: Aug. 8, 2023

(54) DEVICE FOR A SINGLE WIRE DIGITAL BUS, MASTER DEVICE, SENSOR, AND METHOD TO ASSIGN ADDRESSES TO MULTIPLE DEVICES ON A SINGLE WIRE DIGITAL BUS

(71) Applicant: Infineon Technologies AG, Neubiberg (DE)

(72) Inventors: Leo Aichriedler, Puch (AT); Andrii Kazarinov, Villach (AT); Diego Lunardini, Faak am See (AT); Gerhard Pircher, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/076,268

(22) Filed: Oct. 21, 2020

(65) Prior Publication Data

US 2021/0124696 A1    Apr. 29, 2021

(30) Foreign Application Priority Data

Oct. 23, 2019    (DE) .......................... 102019128651.4

(51) Int. Cl.
*G06F 13/16*    (2006.01)
*G06F 7/58*    (2006.01)

(52) U.S. Cl.
CPC .......... *G06F 13/1668* (2013.01); *G06F 7/588* (2013.01)

(58) Field of Classification Search
CPC ........................................................ G06F 1/26
See application file for complete search history.

(56) References Cited

U.S. PATENT DOCUMENTS

| | | | | |
|---|---|---|---|---|
| 4,584,540 A | * | 4/1986 | DuBose | G06F 1/0356 332/104 |
| 5,241,661 A | * | 8/1993 | Concilio | G06F 13/30 710/40 |
| 5,765,036 A | * | 6/1998 | Lim | G06F 13/18 711/147 |
| 6,216,172 B1 | | 4/2001 | Kolblin et al. | |
| 7,076,586 B1 | | 7/2006 | Rowlands et al. | |
| 7,676,342 B2 | | 3/2010 | Vreede et al. | |
| 8,700,747 B2 | | 4/2014 | Spitaels et al. | |
| 8,990,465 B2 | | 3/2015 | Decesaris et al. | |

(Continued)

FOREIGN PATENT DOCUMENTS

| | | |
|---|---|---|
| CN | 201083993 | 7/2008 |
| CN | 101529820 A | 9/2009 |

(Continued)

OTHER PUBLICATIONS

David et al., "Vehicle-Bus Interface with GMLAN for DataCollection," 2003, 1 page.

*Primary Examiner* — Henry Tsai
*Assistant Examiner* — Juanito C Borromeo
(74) *Attorney, Agent, or Firm* — Harrity & Harrity, LLP

(57) ABSTRACT

A device for a single wire digital bus, includes an interface for the bus configured to receive a request to arbitrate for an address and to transmit device specific data on the bus upon receipt of the request to arbitrate for an address The device further includes a control circuit configured to determine, if a further device transmits device specific data on the bus, and to use the address arbitrated for, if no further device transmits device specific data on the bus.

26 Claims, 6 Drawing Sheets

(56) References Cited

U.S. PATENT DOCUMENTS

| | | |
|---|---|---|
| 9,015,267 B2 | 4/2015 | Liu et al. |
| 2002/0019900 A1 | 2/2002 | Kim |
| 2009/0157929 A1 | 6/2009 | Pigott et al. |
| 2016/0179663 A1* | 6/2016 | Roesch ............... G06F 7/58 |
| | | 711/103 |

FOREIGN PATENT DOCUMENTS

| | | |
|---|---|---|
| CN | 102413194 A | 4/2012 |
| CN | 104346303 A | 2/2015 |
| CN | 104516851 B | 11/2017 |
| CN | 106874237 B | 8/2019 |
| DE | 19713240 C2 | 1/1999 |
| EP | 0221303 B1 | 4/1993 |

* cited by examiner

US 11,720,505 B2

DEVICE FOR A SINGLE WIRE DIGITAL BUS, MASTER DEVICE, SENSOR, AND METHOD TO ASSIGN ADDRESSES TO MULTIPLE DEVICES ON A SINGLE WIRE DIGITAL BUS

RELATED APPLICATION

This application claims priority to German Patent Application No. 102019128651.4, filed on Oct. 23, 2019, which is incorporated herein by reference in its entirety.

FIELD

Examples relate to methods to assign addresses to multiple devices on a single wire digital bus, a device for a single wire digital bus, a Master device, and a sensor.

BACKGROUND

Continuously increasing complexity of electronic systems, for example in automobiles, often requires a significant number of sensors to work in parallel, providing measured information to a central control unit. Using parallel bus interfaces for interconnection results in complex PCB designs, area inefficiency and increased costs of the final system, in particular if there are to be wired interconnects between the sensors and the ECU.

Interconnectivity using a serial bus may partly solve the problem. However, it requires either that each slave device has a dedicated chip select pin or that all slave devices connected to the same bus have unique address in order to achieve robust, collision free communication. Solutions with chip select pin require a central microcontroller unit (MCU), which is a bus master, to have a respective number of input/output (IO) pins connected to each slave device or node, which again leads to increased PCB layout complexity and wiring costs. Also, sensor devices are often required to be small and to be produced cost effective, which means a dedicated chip select pin may be undesired to save on cost and area. The number of connections required between a sensor and the bus master (microcontroller) is particularly important in case the connection is established via a wire harness, since cables and connectors contribute significantly to both the cost as well as the expected failure rate of the overall sensor system.

It is therefore desirable to have all sensors connected in parallel and to assign unique addresses to the individual bus members. Principally, unique addresses could be assigned to each sensor slave device during production, but such an approach would be difficult and costly to implement due to the need of maintaining a huge database for the issued addresses. Also, an increased device area and cost would result due to additional non-volatile memory space required for storing the address in the device.

It would therefore be desirable to provide an auto-addressing scheme in which all bus slaves define or arbitrate for their unique address by themselves once being part of a serial bus system.

SUMMARY

An embodiment relates to a device for a single wire digital bus, including an interface for the bus which is configured to receive a request to arbitrate for an address and to transmit device specific data on the bus upon receipt of the request to arbitrate for an address. A control circuit is configured to determine if a further device transmits device specific data on the bus, and to use the address arbitrated for, if no further device transmits device specific data on the bus. A device according to an embodiment wins an arbitration for an address if no further device on the bus does still transmit data. A device can so receive an address without having an address stored upfront and multiple devices can be connected to a bus which then organize themselves to receive individual addresses being disparate.

A further embodiment relates to a device for a single wire digital bus, including an interface for the bus that is configured to receive a request to arbitrate for an address and an analog output interface configured to transmit an address using an analog signal. A device can so communicate its address used for communicating on the digital bus without causing a conflict on the digital bus during address arbitration. Address generation for multiple devices on a bus may so be performed quickly in that all devices can simultaneously transmit their addresses.

A further embodiment relates to a Master device for a single wire digital bus which includes an interface configured to transmit a request for devices to arbitrate for an address on the bus and to receive confirmation on completion of an arbitration upon transmission of the request. An embodiment of a master device may control multiple devices on a bus to arbitrate for addresses so that an arbitrary number of devices may be used with a master device.

A further embodiment relates to a method to assign addresses to multiple devices on a single wire digital bus which includes receiving a request to arbitrate for an address and transmitting device specific data on the bus. The method further includes determining, if a further device transmits device specific data on the bus as well as using the address arbitrated for if no further device transmits device specific data on the bus. The method can so provide an address without having an address stored upfront and multiple devices can be connected to a bus which then organize themselves to receive individual addresses.

A further embodiment relates to a method to assign addresses to multiple devices on a single wire digital bus which includes receiving a request to arbitrate for addresses via the bus and transmitting an address via an analog line. The method may so communicate an address used for communicating on the digital bus without causing a conflict on the digital bus during address arbitration.

BRIEF DESCRIPTION OF THE DRAWINGS

Some examples of apparatuses and/or methods will be described in the following by way of example only, and with reference to the accompanying figures, which illustrate FIG. 1 an embodiment of a device for a single wire bus.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
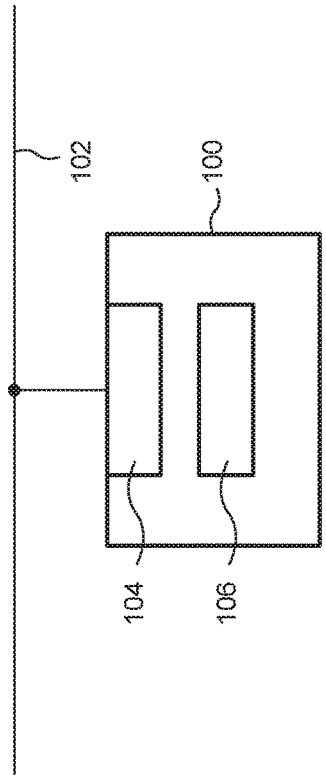

FIG. 1 shows an embodiment of a device 100 for a single wire bus. The device 100 is attached to a single wire bus 102 and can be used together with multiple other devices to communicate via single wire bus 102. For that purpose, a unique address can be assigned to the device 100 to identify the device 100 amongst multiple devices jointly communicating via the single wire bus 102. A single wire bus may be a data bus for digital communication having only a single wire connection for data transfer or a single pair of differential signal wires. As opposed to parallel buses, multiple parallel signal lines can be saved as well as an additional signal line for the distribution of a clock signal.

The device comprises an interface 104 for the bus 102 as well as a control circuit 106. The interface 104 serves to communicate via the bus 102 and to transmit and receive data to and from the bus. According to an embodiment of a device 100, the interface is configured to receive a request to arbitrate for an address and to transmit device specific data on the bus 102 upon receipt of the request to arbitrate for the address. The request to arbitrate for an address may be issued by a further device connected to the bus 102, for example, by a bus master or a master device present on the bus. A bus master may, for example, initialize the bus upon start up of the system and schedule data transfer on the bus afterwards. In further embodiments, however, the request to arbitrate for an address may likewise be issued by a further device on the bus that is similar to or identical to the device 100 of FIG. 1 since a bus master may not necessarily be present in the embodiments discussed herein. The request to arbitrate for an address itself may be communicated by any kind of message or signal transmittable via the bus 102 that is identifiable by device 100 as a command to start arbitration for an address.

The request to arbitrate for an address may already include the address to arbitrate for or it may be just the command to start arbitrating for an address while an individual address to arbitrate for is determined by each device 100 itself. For the following considerations it shall be assumed that both alternatives are included, unless explicitly stated otherwise.

Upon receipt of the request to arbitrate for an address, the interface transmits device specific data on the bus to arbitrate for the address. The device specific data may be an address internally derived by the device 100 itself, for example by means of a random number generator. According to some embodiments, therefore, the address is transmitted as the device specific data. According to other embodiments, the device specific data may be generated using a random number generator.

Device specific data may also be any other kind of data potentially uniquely identifying a single device 100, for example a digital number derived using any source of uncertainty (randomness) available inside the device 100, such as for example temperature, noise, oscillator frequency deviations or the like. For example, since a frequency of an internal clock will slightly deviate amongst different devices 100, it is probable that a value of a rolling counter within different devices 100 holds a unique number for each device once a sufficient amount of time after starting the rolling counter (after startup of the system) lapsed. Likewise, the device specific information may be derived using partly or only deterministic information accessible by and unique to the device. For example, a type of a sensor within device 100, calculations based on trimming values stored within a device or a sensor may be used for that purpose. A unique number already stored in the device 100 may also be used as device specific data during arbitration for an address, such as for example a serial number or a part of the serial number of the device. It may be important that the probability that the device specific data differs for each device is high to avoid collisions during arbitration for the addresses on the bus and to enable the arbitration to finish quickly.

The control circuit 106 is configured to determine, while the device specific data is transmitted on the bus, if a further device transmits device specific data on the bus and to use the address arbitrated for, if no further device transmits device specific data on the bus. Therefore, if device 100 is the device on the bus that is capable to transmit device specific data for the longest period amongst all devices on the bus, device 100 wins the arbitration for the address. Hence, the device 100 may subsequently use the address arbitrated for with the certainty that no other device uses the address so that no collision occurs in subsequent digital communication via single wire data bus 102.

Subsequently, there will be illustrated different ways how to achieve that device specific data translates into the fact that some devices transmit device specific data on the bus for a shorter period of time than others.

Figure 2:
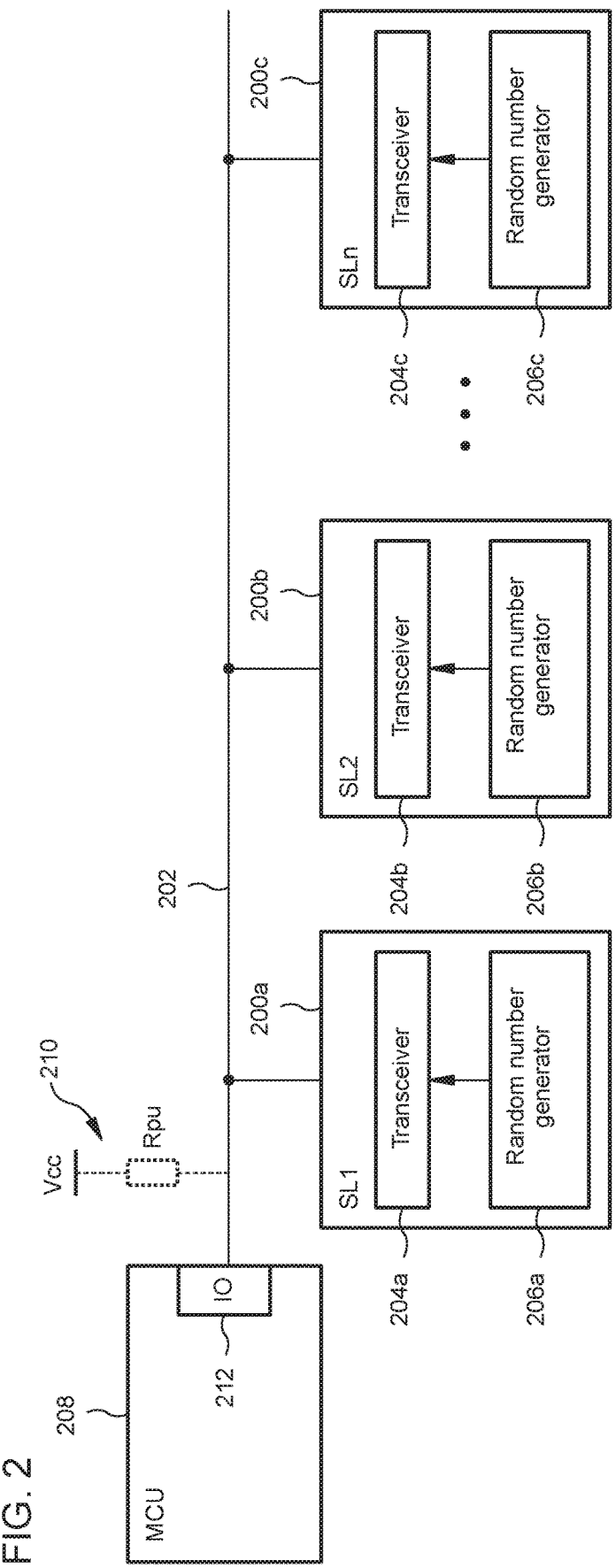
FIG. 2 an embodiment of a system comprising multiple embodiments of devices and a master device.

FIG. 2 illustrates an embodiment of a system comprising multiple embodiments of devices and a master device. In the example illustrated in FIG. 2, 3 devices 200a, 200b, and 200c are present on a single wire bus 200. Further, one master device 208 is present to initialize the communication on single wire bus 202 and to trigger arbitration for addresses for the individual devices 200a to 200c upon start up. Each device comprises an interface 204a, 204b, 204c and a control circuit 206a, 206b, and 206c, respectively. The bus 200 comprises a pull-up circuit which is a passive circuit to pull a signal level (e.g. a voltage level) on the bus 202 to a predetermined level if none of the devices 200a to 200c pull the signal level to another level. For that purpose, interfaces 204a, 204b, 204c (transceivers) may operate in open drain/collector mode. In such a configuration, there exists a dominant signal level. If the dominant signal level is transmitted on the bus by only a single device, the non-dominant signals simultaneously transmitted by other devices are overturned and the bus has the dominant signal level. Depending on the implementation, the dominant signal level may correspond to either logical codes "1" or "0". For the following considerations it is assumed that "0" is the dominant signal level.

If the master device 208 initiates address arbitration, it transmits a request for devices to arbitrate for an address on the bus via its interface 212 used to communicate via the bus 202. For example, the request may be a broadcast frame containing the request to start an address arbitration process. Upon receipt of the request to arbitrate for an address, devices 200a to 200c start transmitting their device specific data on the bus as a sequence of bits. If a device monitors a signal level on the bus 202 that does not correspond to the bit value presently transmitted by the device itself, the device concludes that there is another device present that simultaneously sends at dominant signal level. As a consequence, the device enters an idle state and does no longer transmit its device specific data. Transmitting bits of the device specific data then continues with the next bit. At the end of an arbitration cycle, there is one device that was able to transmit all bits and wins arbitration. From the winning devices perspective, no further device transmits device specific data on the bus and the last bit of the sequence of bits corresponding to device specific information of the winning device is present on the bus at the end of the arbitration cycle. In this case, the control circuit of the winning device concludes that the device can use the address arbitrated for in the respective arbitration cycle.

The winning device may then send a confirmation signal (acknowledge) to the master device 208, store its device specific data as an address for further communication and enter into an idle mode in which it does no longer react to subsequent requests to start an address arbitration process. In the event that the request to arbitrate for an address sent by the master device 208 did not contain the address to be arbitrated for, the confirmation signal sent to the master device 208 may optionally comprise the address of the device winning the arbitration.

After the first device confirmed the arbitration, device arbitration cycles are repeated until no further confirmation is received by the master device 208, meaning that all devices have successfully arbitrated for an address. Afterwards, communication via a single wire bus 202 can start. Optionally, the subsequent communication via the single wire bus 200 may be performed in push/pull mode rather than in open drain/collector mode to increase speed of the communication.

Figure 3:
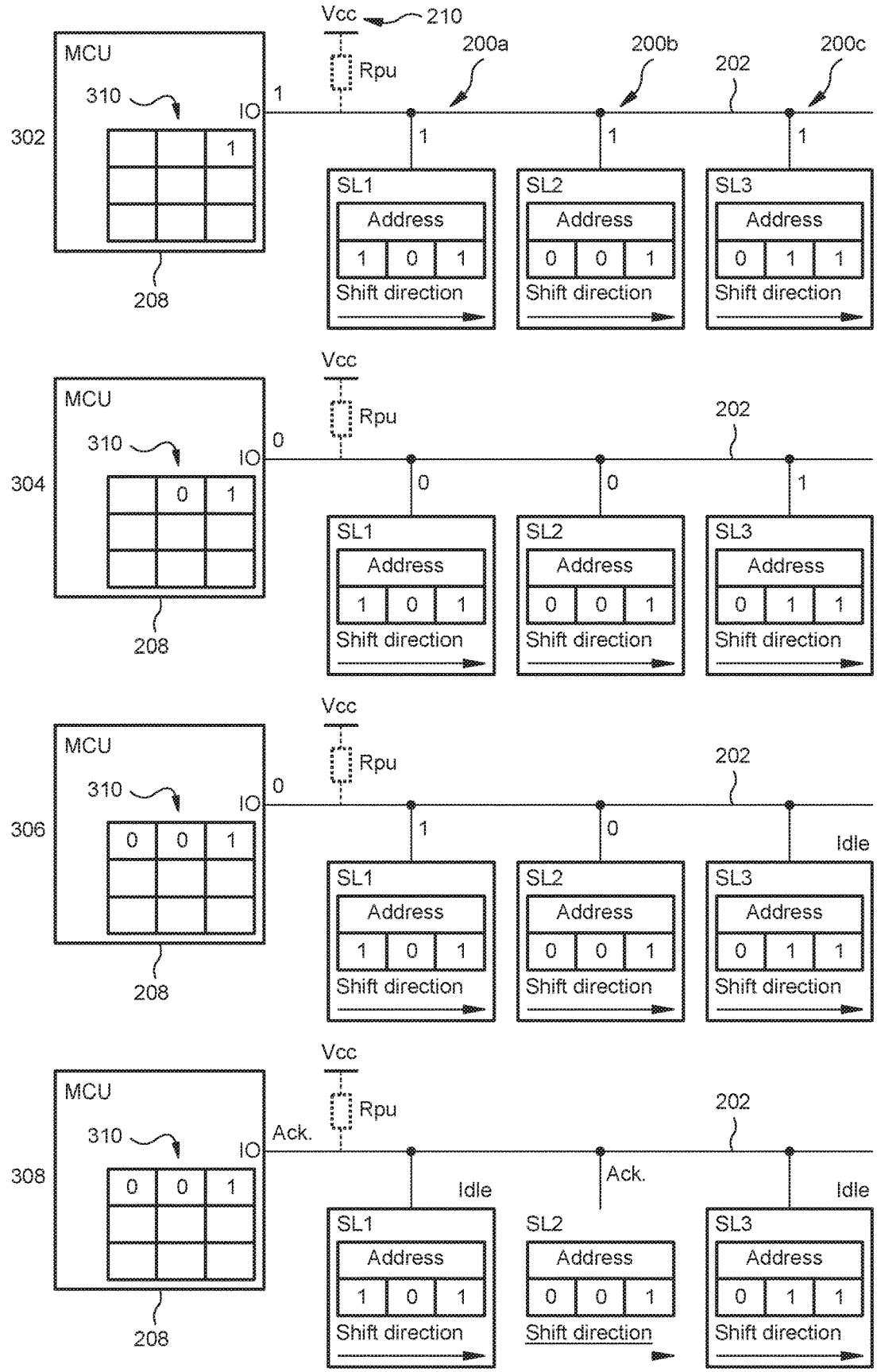
FIG. 3 an example for an arbitration for an address using a device of FIG. 2.

FIG. 3 graphically illustrates an arbitration cycle described in the previous paragraphs. The figure illustrates a first arbitration cycle out of three arbitration cycles required to assign a unique address to each device 200a to 200c. It is assumed that first device 200a holds the bit sequence 101 as a device specific data, which is, for example, generated using a random number circuit. It is further assumed that device 200b uses device specific data 001 and that device 200c uses device specific data 011. Further it is assumed that "0" is the dominant bit. Upon receipt of the request to arbitrate for an address issued by the master device 208, all devices 200a to 200c start transmitting their device specific data on the bus 202. For the first bit of the series of three bits to be transmitted on the bus 202, all devices transmit "1", as illustrated by the first line 302 of the illustration of FIG. 3. Since none of the devices monitors a different bit on the bus 202 than the one transmitted by the device itself, none of the devices enters idle state. Master controller 208 receives the first bit of the sequence of bits representing the device specific data or the address and stores it into a register 310. As illustrated by means of line 304, the second bit is subsequently transmitted on the bus and the bit value of "1" transmitted by the third device 200c is overturned by the dominant bits "0" transmitted by devices 200a and 200b. Therefore, third device 200c enters idle state and does no longer transmit bits. Master controller 208 stores bit "0" in the register. Line 306 illustrates the submission of the third bit of the device specific data, which is only performed by the first and the second devices 200a and 200b. The first device 200a transmits bit "1", however, is overturned by device 200b which submits dominant bit "0". As a consequence, the first device 200a enters into idle mode and the second device 200b determines that the last bit of the sequence of bits representing the device specific data has been transmitted on the bus and that the signal on the bus corresponds to the last bit of second device 200b. Consequently, the second device 200b concludes that no further device transmits device specific data on the bus and, therefore, that it won the arbitration for the address. Second device 200b sends an acknowledgment signal as a confirmation on completion of an arbitration to the master device 208. Master device 208 now has a complete address of a device attached to the single wire bus 202 stored in its register 310 and continues to transmit requests for arbitration for an address on the bus 202 until no further acknowledgments are received.

At the end of all address arbitration cycles, the master 208 has a complete list of unique addresses including each device so that communication can start, allowing to unambiguously address every device on the bus. The previous example has been illustrated assuming that it is the address that is used as device specific data by the individual devices 200a to 200c. However, further embodiments may likewise include the address to be arbitrated for into the request for arbitration sent by the master device 208 so that the winning device stores this address while using arbitrary device specific data during the arbitration process.

Figure 4:
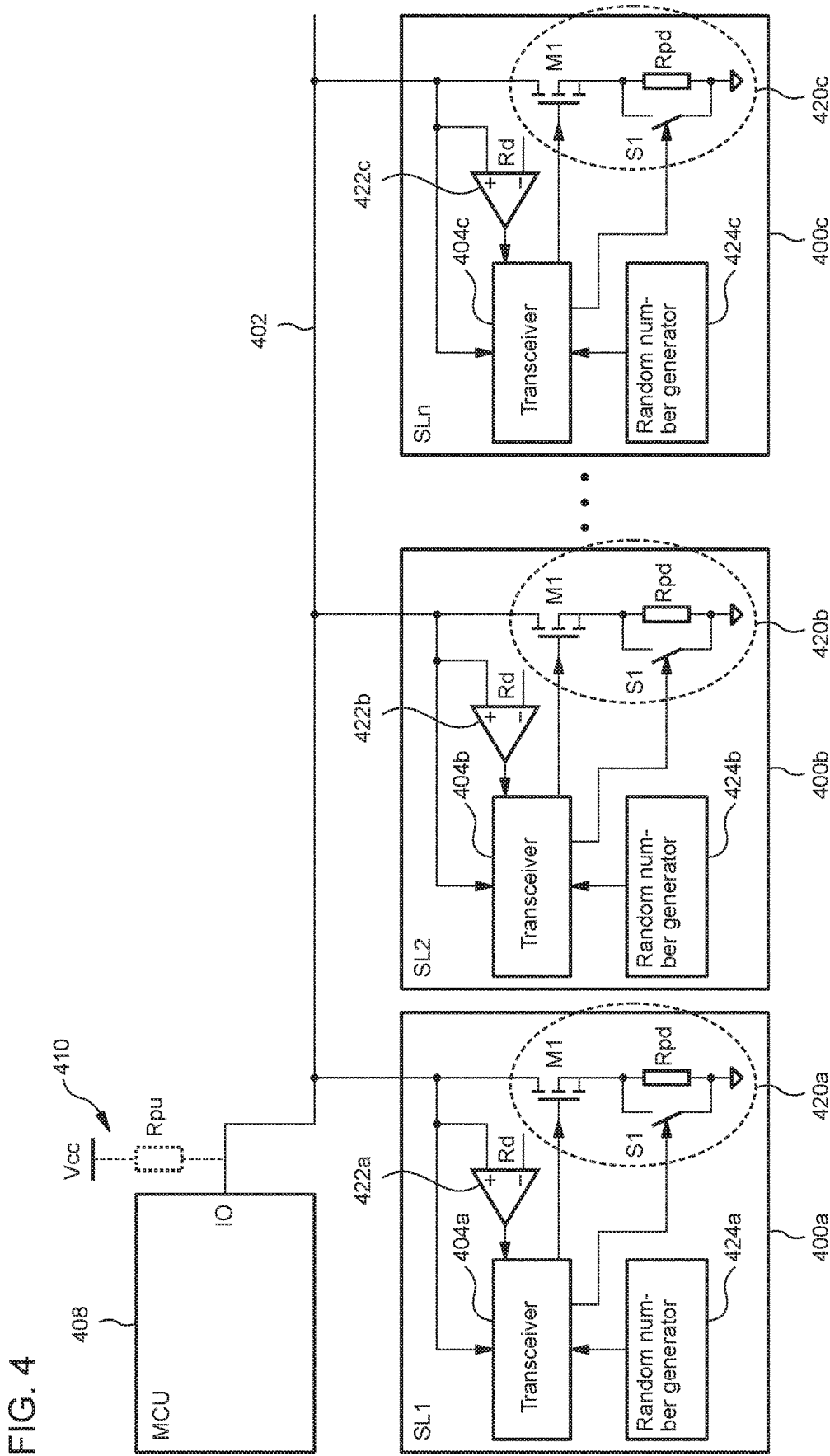
FIG. 4 a further embodiment of a system comprising multiple embodiments of devices and a master device.

FIG. 4 illustrates a further embodiment implementing a different way to achieve that device specific data translates into the fact that some devices transmit device specific data on the bus for a shorter period of time than others.

Like FIG. 2, FIG. 4 illustrates a single wire bus 402, a master controller 408 and three devices 400a to 400c attached to the single wire bus 402. Likewise, single wire bus 402 comprises a pull-up circuit 410 and the interfaces 404a to 404c of the devices 400a to 400c operate in open drain/collector configuration during address arbitration. Further to the embodiments illustrated in FIG. 2, devices 400a to 400c comprise circuitry 420a to 420c that serves as a current sink as well as comparators 422a to 422c. Circuitry 420a to 420c of all devices 400a to 400c draw the same amount of current when activated.

Assuming current sink circuitry as illustrated in FIG. 4, comprising an NMOS most transistor $M_1$ and a load resistor $R_{pd}$, sink current $I_{out}$ drawn by each circuit 420a to 420c can be estimated to be:

$$I_{out} = \frac{(Vdd - V_{th})}{R_{PD}},$$

where Vdd is the voltage applied to M1 gate, and $V_{th}$ is the threshold voltage. The bus voltage seen by all slave nodes is, therefore, defined by the number of devices driving the serial bus low, with $R_{PU}$ denoting the Pull Up resistor 410:

$$V_{BUS} = V_{CC} - R_{PU} \cdot \Sigma_{i=1}^{N} Iout_i.$$

Further, all devices contain a source of randomness 424a to 424c that generates the device specific data.

Figure 5:
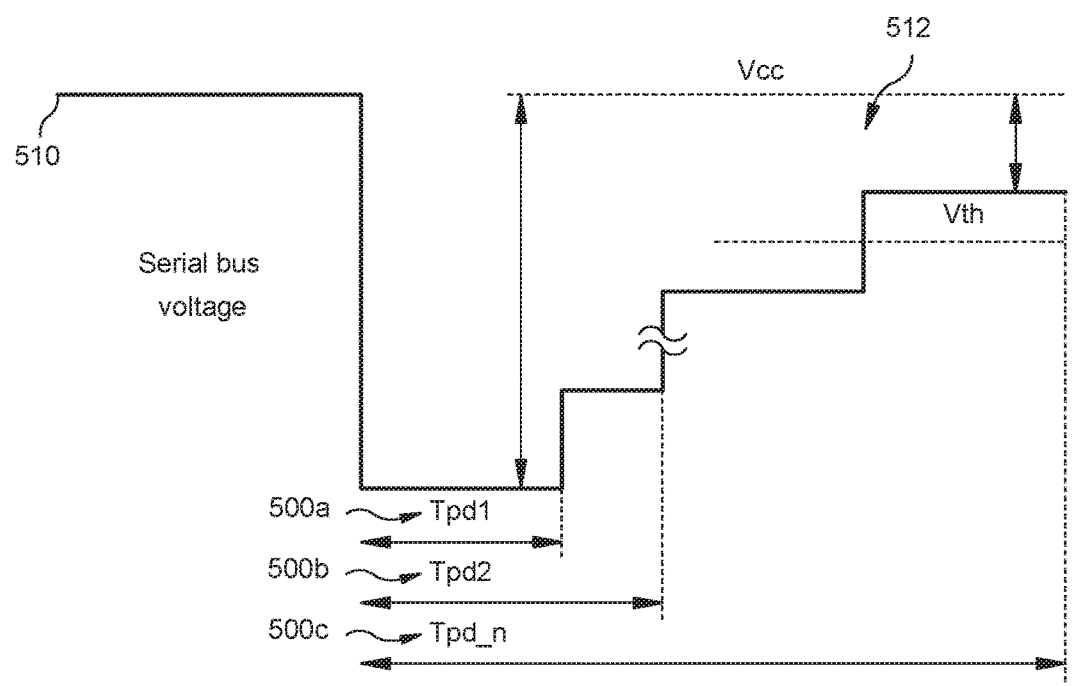
FIG. 5 an example for signal patterns occurring on a bus during arbitration.

When the master device 408 transmits the request to arbitrate for an address, e.g. by means of a broadcast message, all devices activate circuitry 420a to 420c for a time period corresponding to the device specific data and decrease the bus voltage for that period of time as illustrated in FIG. 5.

FIG. 5 illustrates the voltage on the bus 510 versus time. It is assumed that the device specific data of the first device 420a corresponds to a first time period 500a, while time periods 500b and 500c correspond to device specific data of devices 400b and 400c, respectively. Given the different time periods, the voltage on the bus is a step function, the steps occurring at the end of the time periods corresponding to the individual device specific data. The device having the highest device specific data draws current from the bus 402 the longest and can determine that no further device transmits device specific data on the bus by observing the presence of the last step of voltage increase 512. To this end, all devices set the threshold value of their comparators 422a to 422c within the range of step 512, i.e. the threshold voltage $T_{th}$ is set within the interval:

$$V_{CC} - 2 \cdot R_{PU} \cdot I_{out} < V_{TH} < V_{CC} - R_{PU} \cdot I_{out}.$$

Only the device which accesses the bus 402 for the longest time observes a voltage that is higher than the threshold and can hence conclude that it won arbitration. In other words, according to the previously described embodiment, the interfaces transmit the device specific data by accessing the bus (drawing current from the bus) for a period of time corresponding to the device specific data. Further, the devices or their controllers determine that no further devices submit device specific data on the bus if the signal level increases above a predetermined threshold while the devices access the bus.

A device having determined that no further devices submit device specific data on the bus wins arbitration. Depending on the implementation, that device may store an address submitted together with the request to arbitrate for an address as its future address and submit an acknowledgment to the master device 408. Alternatively, the device may store the device specific data as its future address and may further optionally include that address into the confirmation on completion of an arbitration (an acknowledgment). After sending an acknowledgment, the winning device enters idle state to not participate in subsequent arbitration cycles.

Figure 6:
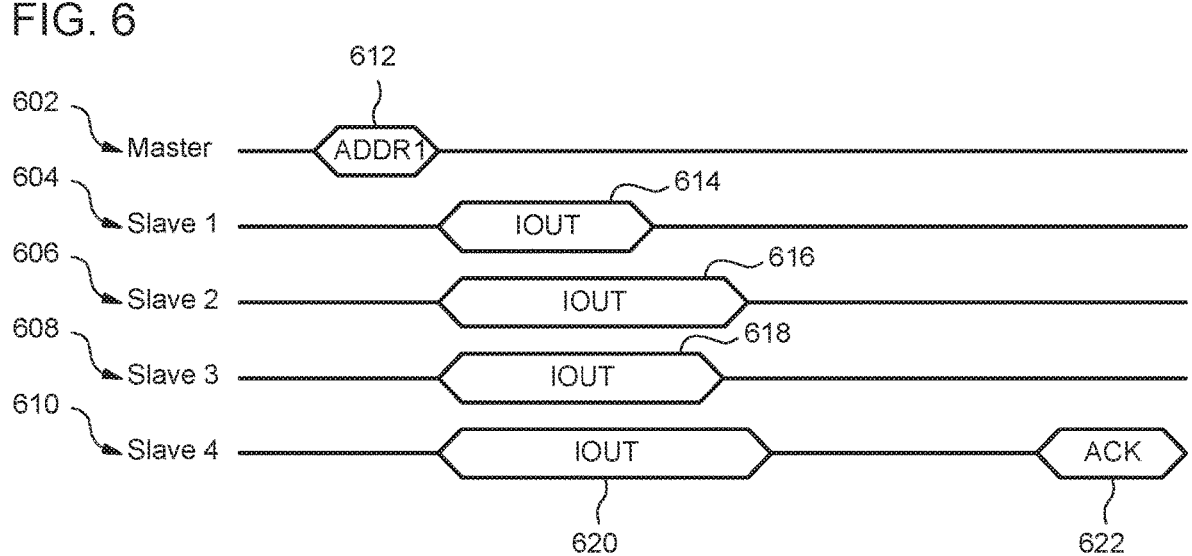
FIG. 6 a further example for an arbitration for an address using a device of FIG. 4.

FIG. 6 again illustrates an arbitration cycle of 4 slaves in a slightly different representation. The signals transmitted on the bus 402 are schematically illustrated for a master device 602 and for four devices 604 to 610. Upon receipt of the request to arbitrate for an address 612 (issued by master device 602), all devices start to draw current for the time periods 614 to 620 schematically illustrated in FIG. 6. Device 610 draws current for the longest time period 620 and wins arbitration, which is confirmed by means of confirmation on completion signal 622 (acknowledgment) transmitted by device 610.

According to some embodiments, the confirmation on completion signal 622 may be transmitted with a variable delay and with fixed time difference with respect to the request to arbitrate for an address 612 to ensure that each arbitration cycle has the same length, which may result in simplified synchronization between master device 602 and devices 600-610.

In the previously described embodiment, Master device 408 and devices 400a to 400c are immediately aware of address collisions during arbitration (which correspond to equal device specific data) due to the comparator circuit inside each device. Therefore, they do not need to reset all addresses in case of collisions. In embodiments where the address to be arbitrated for is included in the request of the master device 408, the address itself is not derived using a random number generator or other randomness. This allows to use a wider range for the device specific data than for the address space, which may further decrease the probability of collisions during address resolution.

Very much like in the embodiment illustrated in FIGS. 2 and 3, at the end of the auto-addressing phase where each device has its own unique address to digitally communicate via the single wire bus, the output stage of each device may be switched to push-pull configuration in order to maximize bus communication speed.

Figure 7:
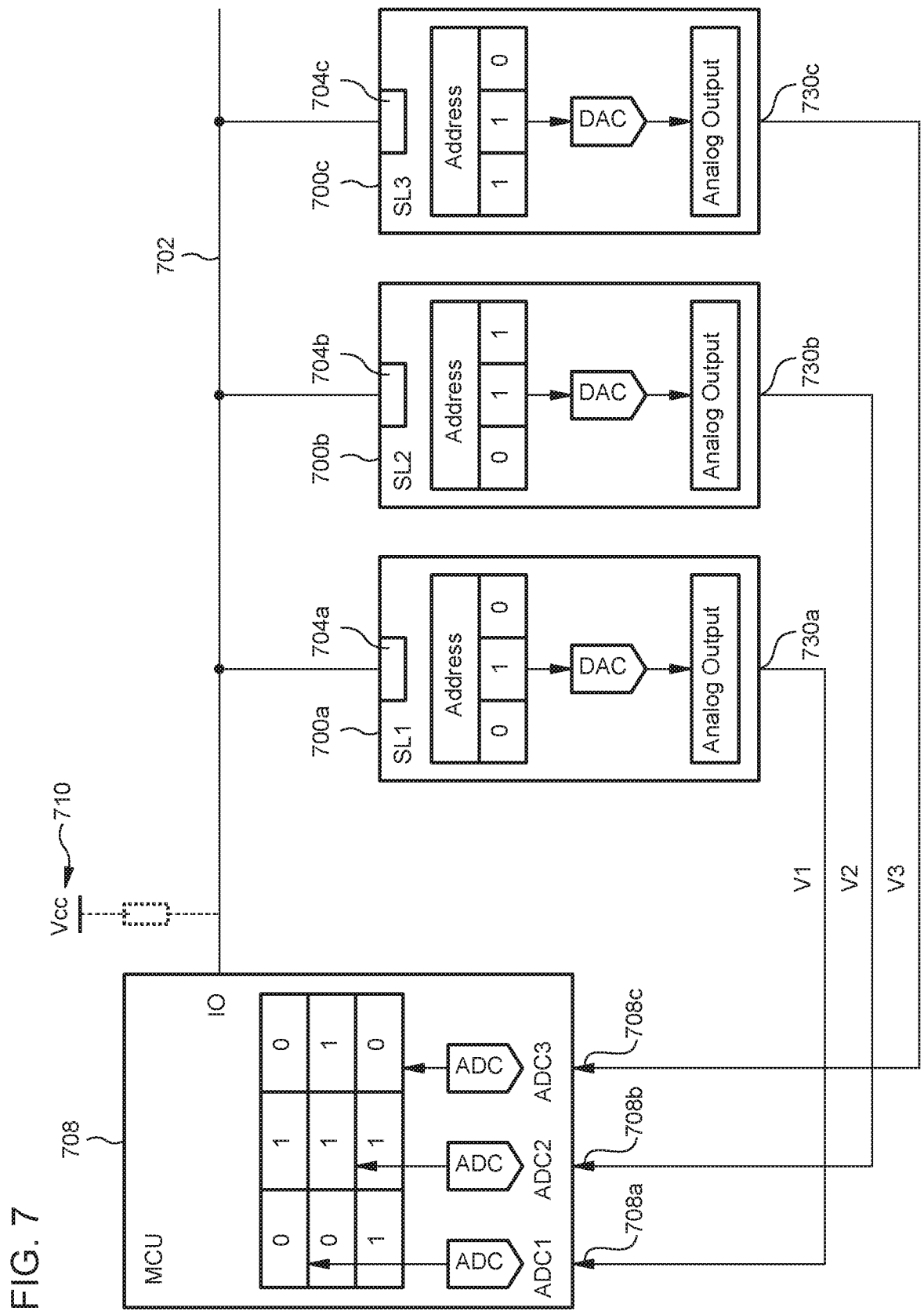
FIG. 7 a further embodiment of a system comprising multiple embodiments of devices and a master device.

FIG. 7 illustrates a further embodiment of a system comprising multiple embodiments of devices 700a, 700b, and 700c as well as a master device 708. Further to the devices illustrated before, each of devices 700a to 700c additionally comprises an analog signal output 730a, 730b, and 730c. Further to the connection via the digital single wire bus 702, each of the devices 700a, 700b, and 700c is additionally connected to a dedicated analog signal input 708a, 708b, and 708c of the master controller 708. Such devices may, for example, be sensors (e.g. current sensors or magnetic sensors) that sense a physical quantity and which transmit the measured quantity by means of an analog signal to the master controller 708.

In the system illustrated in FIG. 7, the arbitration for an address for each of the devices 700a to 700c also involves the analog signal lines between the devices and the master device. Once a device receives a request to arbitrate for an address via its interface for the digital single wire bus that, a device transmits an address using an analog signal via the analog signal output 730, 730b, and 730c.

The address may be encoded in the analog signal according to an arbitrary encoding scheme. For example, an analog voltage level may be used which is proportional to the address determined within the devices 700a to 700c. To this end, the Analog output interfaces 7300a, 730b and 730c may be configured to set a signal level of the output signal to the fraction of a maximum signal level that corresponds to the address.

For example, if the maximum voltage level was $V_{CC}$, a voltage level $V_i$ corresponding to an address $ADDRESS_i$ may be determined by:

$$V_i = V_{CC} \cdot \frac{ADDRESS_i}{2^N}$$

Given that $2^N$ is the address space.

The master controller 708, consequently, decodes the voltage levels into the address according to the following equation:

$$ADDRESS_i = 2^N \cdot \frac{V_i}{V_{CC}}.$$

Alternatively, voltage pulses may be used to encode the address having a width which is proportional to the address. Just to name a further alternative, a sequence of voltage levels may also be transmitted, each item of the sequence representing a single bit of an address.

According to the embodiment illustrated in FIG. 7, generating and registering unique addresses within the master controller 708 may only require one single arbitration cycle. Further, devices 700a to 700c do not need to be precisely synchronized to each other for address arbitration. Further, the Master device 708 receives the addresses in parallel through dedicated lines and, therefore, knows which device sends which address.

As discussed previously, some embodiments may use deterministic information to derive the device specific data, while others may rely on the generation of randomness or the use of random number generators to derive the device specific data used for arbitration. A random number generator may be based on a source of uncertainty available inside a device, as for example temperature, noise, oscillator frequency deviations, etc. One embodiment uses a rolling counter that continuously runs at the system clock frequency. Since clock frequency slightly deviates at different devices, it is highly probable that value of the counter after some time from the startup will also be different for different devices. Random number generation may be combined with deterministic information available internally to the sensor if needed (i.e. type of the sensor, calculations based on trimming values etc.). Optionally a unique address or code already stored in each device for other purposes may supplement the generation of device specific data or be used as device specific data instead.

The flowcharts illustrated in FIGS. 8 and 9 again illustrate embodiments of methods to assign addresses to multiple devices on a single wire digital bus which may be implemented using the previously described embodiments.

Figure 8:
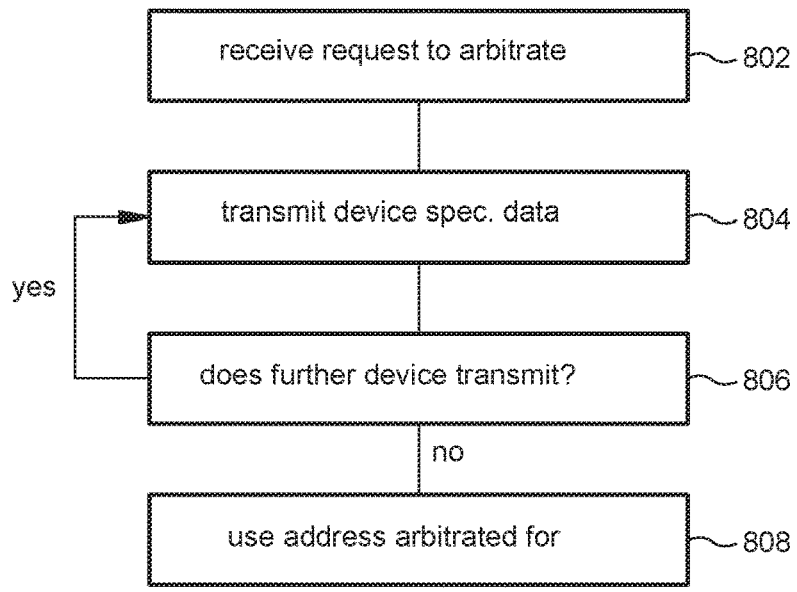
FIG. 8 a flowchart of an embodiment of a method to assign addresses to multiple devices on a single wire digital bus.

The embodiment of a method to assign addresses to multiple devices on a single wire digital bus illustrated in FIG. 8 comprises receiving a request to arbitrate 802 for an address and transmitting device specific data 804 on the bus. The method further comprises determining, if a further device transmits device specific data on the bus 806 and using the address 808 arbitrated for, if no further device transmits device specific data on the bus.

Figure 9:
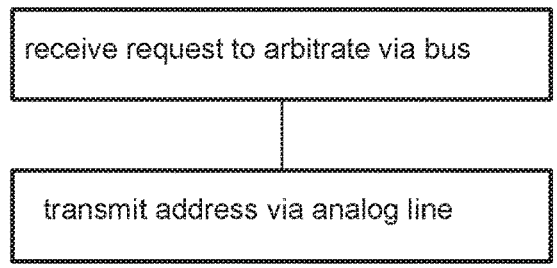
FIG. 9 a further flowchart of an embodiment of a method to assign addresses to multiple devices on a single wire digital bus.

The embodiment of a method to assign addresses to multiple devices on a single wire digital bus illustrated in FIG. 9 comprises receiving a request to arbitrate 902 for addresses via the bus and transmitting an address via an analog line 904.

While the embodiments have previously been described mainly in general terms with respect to an arbitrary device, there exist multiple use cases where devices attached to the digital single wire bus shall be enabled to auto organize and to automatically determine the individual addresses used for communication via the single wire bus. For example, in automotive applications, a multiplicity of sensors is often used to communicate with an Electronic Control Unit (ECU) which evaluates the sensor data. Often, the ECU takes the role of the master controller in such systems. Using sensors comprising an embodiment of a device that is capable to automatically generate unique addresses provides some benefits. For example, multiple devices of different manufacturers may be combined without the need of being customized for each individual set up. Further, different applications may use different amounts of sensors applied, without the number of sensors being known upfront. As opposed to approaches where the unique address of a sensor is programmed into the sensor during production, large administrative overhand for bookkeeping purposes and to maintain databases with the individual addresses can be saved.

Figure 10:
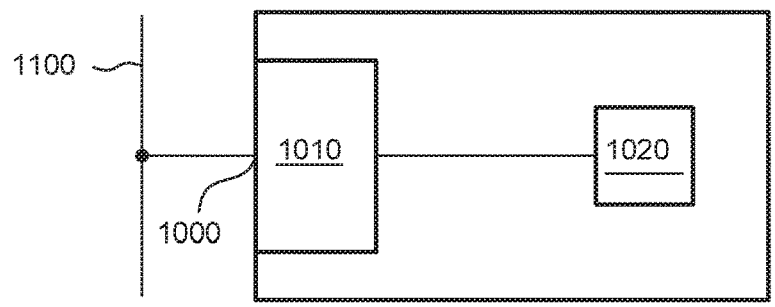
FIG. 10 an embodiment of a sensor.

FIG. 10 illustrates an embodiment of a sensor 1000 for sensing a physical quantity. The sensor comprises an embodiment of a device 1010 for a single wire digital bus 1100 as previously discussed to enable the sensor to communicate via the bus 1100 and to optionally transmit sensor data describing the sensed physical quantity via the bus 1100 to a ECU or to an arbitrary other device. The sensor further comprises sensing circuitry 1020 for measuring the physical quantity. Some embodiments of sensors may constitute an angle sensor, a current sensor, a pressure sensor or a magnetic sensor. However, further embodiments may likewise comprise circuitry to measure any other physical quantity of interest.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A device for a single wire digital bus, comprising:
an interface for the single wire digital bus, the interface configured to receive on the single wire digital bus a request to arbitrate for an address and transmit first device specific data on the single wire digital bus upon receipt of the request to arbitrate for the address; and
a control circuit configured to monitor for any further device that concurrently transmits further device specific data on the single wire digital bus while the interface transmits the first device specific data on the single wire digital bus and the control circuit is configured to use the arbitrated address for a further transmission on the single wire digital bus if the control circuit does not detect any further device that concurrently transmits further device specific data on the single wire digital bus while the interface transmits the first device specific data on the single wire digital bus.

2. A device for a single wire digital bus, comprising:
a digital interface for the single wire digital bus that is configured to receive a request to arbitrate for an address; and
an analog output interface configured to transmit the address using an analog output signal in response to receiving the request to arbitrate for the address, wherein the analog output interface is configured to modulate the analog output signal to correspond to the address,
wherein the analog output interface is configured to set a signal level of the analog output signal within a range up to a maximum analog signal level, and the analog output interface is configured to set the signal level of the analog output signal to a fraction of the maximum analog signal level, wherein the fraction to which the signal level of the analog output signal is set corresponds to the address.

3. The device of claim 1, wherein:
the interface is configured to transmit the first device specific data on the single wire digital bus sequentially as a sequence of bits,
for each transmitted bit of the sequence of bits, the control circuit is configured to compare a bit value of the transmitted bit of the sequence of bits with a bit value on the single wire digital bus, and
on a condition that the bit value on the single wire digital bus is different from the bit value of the transmitted bit, the control circuit is configured to detect that a further device is concurrently transmitting on the single wire digital bus.

4. The device of claim 3, wherein, on the condition that the bit value on the single wire digital bus is different from the bit value of the transmitted bit, the control circuit is configured to set the device into an idle state.

5. The device of claim 4, wherein, on a condition that the bit value on the single wire digital bus is the same as the bit value of the transmitted bit, the interface is configured to transmit a next bit of the sequence of bits on the single wire digital bus.

6. The device of claim 3, wherein, on the condition that the bit value on the single wire digital bus is different from the bit value of the transmitted bit, the control circuit is configured to disregard the arbitrated address.

7. The device of claim 3, wherein, on the condition that the bit value on the single wire digital bus is different from the bit value of the transmitted bit, the control circuit is configured to cease transmitting a remaining portion of the sequence of bits.

8. The device of claim 3, wherein, on a condition that the bit value on the single wire digital bus is the same as the bit value of the transmitted bit, the interface is configured to transmit a next bit of the sequence of bits on the single wire digital bus or, if the transmitted bit is a last bit of the sequence of bits, confirm that all bits of the sequence of bits and use the arbitrated address for the further transmission.

9. The device of claim 3, wherein, on a bit-by-bit basis, the control circuit is configured to compare the bit value of the transmitted bit of the sequence of bits with the bit value on the single wire digital bus to generate a comparison result such that the comparison result is determined prior to the interface transmitting a next bit of the sequence of bits, wherein the comparison result is indicative of whether or not a further device is concurrently transmitting on the single wire digital bus.

10. The device of claim 3, wherein:
while transmitting a bit of the sequence of bits, the control circuit is configured to compare a bit value of the transmitted bit with a bit value on the single wire digital bus, and
on the condition that the bit value on the single wire digital bus is different from the bit value of the transmitted bit, the control circuit is configured to detect that a further device is concurrently transmitting on the single wire digital bus.

11. The device of claim 3, wherein, on a condition that the bit value on the single wire digital bus is the same as the bit value of the transmitted bit, the interface is configured to transmit a next bit of the sequence of bits on the single wire digital bus.

12. The device of claim 11, wherein the control circuit is configured to determine that the device has won an arbitration for the address if all bits of the sequence of bits have been transmitted on the single wire digital bus without detecting a deviation from the sequence of bits on the single wire digital bus.

13. The device of claim 3, wherein the control circuit is configured to detect that the bit value on the single wire digital bus is different from the bit value of the transmitted bit when the bit value of the transmitted bit is a non-dominant bit value and when any further device concurrently transmits a dominant bit value on the single wire digital bus while the transmitted bit is being transmitted.

14. The device of claim 1, wherein the request to arbitrate for the address comprises the address for which to arbitrate.

15. The device of claim 1, wherein the address is transmitted as the first device specific data.

16. The device of claim 1, further comprising:
a random number generator configured to generate the first device specific data.

17. A method performed by a device for arbitrating for an address on a single wire digital bus, comprising:
receiving, on the single wire digital bus, a request to arbitrate for the address;
transmitting first device specific data on the single wire digital bus upon receipt of the request to arbitrate for the address, wherein the first device specific data is transmitted on the single wire digital bus sequentially as a sequence of bits;
monitoring for any further device that concurrently transmits further device specific data on the single wire digital bus while the first device specific data is being transmitted on the single wire digital bus; and
using the arbitrated address for a further transmission on the single wire digital bus if a further device that concurrently transmits further device specific data on the single wire digital bus while the first device specific data is being transmitted on the single wire digital bus is not detected,
wherein monitoring for any further device that transmits the further device specific data on the single wire digital bus while the first device specific data is being transmitted on the single wire digital bus comprises:
for each transmitted bit of the sequence of bits, comparing a bit value of the transmitted bit of the sequence of bits with a bit value on the single wire digital bus, and
on a condition that the bit value on the single wire digital bus is different from the bit value of the transmitted bit, detecting that a further device is concurrently transmitting on the single wire digital bus.

18. A device for a single wire digital bus, comprising:
an interface for the single wire digital bus, the interface configured to receive on the single wire digital bus a request to arbitrate for an address and transmit first device specific data on the single wire digital bus upon receipt of the request to arbitrate for the address; and
a control circuit configured to monitor for any further device concurrently transmitting further device specific data on the single wire digital bus while the interface transmits the first device specific data on the single wire digital bus and the control circuit is configured to use the arbitrated address for a further transmission on the single wire digital bus if the control circuit determines that arbitration for the address has been won by the device,
wherein the interface is configured to transmit the first device specific data by changing a signal level on the single wire digital bus by a predetermined amount for a unique period of time that corresponds to the first device specific data, and
wherein the control circuit is configured to measure the signal level on the single wire digital bus while transmitting the first device specific data on the single wire digital bus, compare the measured signal level on the single wire digital bus to a predetermined threshold during the unique period of time, and, on a condition that the measured signal level exceeds a predetermined threshold during the unique period of time, determine that the device has won the arbitration for the address.

19. The device of claim 18, wherein the control circuit is configured to detect a collision with the further device if the measured signal level does not exceed the predetermined threshold at any point during the unique period of time.

20. The device of claim 18, wherein the control circuit is configured to determine that the device has lost the arbitration for the address if the measured signal level does not exceed the predetermined threshold during the unique period of time.

21. The device of claim 18, wherein the interface is configured to draw a predetermined current from the single wire digital bus for the unique period of time to change the signal level on the single wire digital bus by the predetermined amount.

22. The device of claim 18, wherein the control circuit comprises a comparator configured to compare the measured signal level on the single wire digital bus with the predetermined threshold and determine that no further device transmits any further device specific data on the single wire digital bus while the first device specific data is being transmitted if the measured signal level exceeds the predetermined threshold during the unique period of time.

23. A method performed by a device for arbitrating for an address on a single wire digital bus, comprising:
   receiving, on the single wire digital bus, a request to arbitrate for the address;
   transmitting first device specific data on the single wire digital bus upon receipt of the request to arbitrate for the address, wherein the first device specific data is transmitted by changing a signal level on the single wire digital bus by a predetermined amount for a unique period of time that corresponds to the first device specific data;
   monitoring for any further device concurrently transmitting further device specific data on the single wire digital bus while transmitting the first device specific data on the single wire digital bus;
   using the arbitrated address for a further transmission on the single wire digital bus if arbitration for the address has been won by the device;
   measuring the signal level on the single wire digital bus while transmitting the first device specific data on the single wire digital bus;
   comparing the measured signal level on the single wire digital bus to a predetermined threshold during the unique period of time; and
   on a condition that the measured signal level exceeds a predetermined threshold during the unique period of time, determining that the device has won the arbitration for the address.

24. The device of claim 2, wherein the analog output interface is configured to calculate the fraction according to the function $Sa = Smax \cdot (Address/2^N)$, wherein Sa denotes the signal level of the analog output signal, Smax denotes the maximum analog signal level, Address denotes digital value of the address, and N denotes an address space of the address.

25. The device of claim 2, wherein the analog output interface is configured to set a pulse width of the analog output signal that is proportional to the address.

26. A method performed by a device for arbitrating for an address on a single wire digital bus, comprising:
   receive a request to arbitrate for an address on the single wire digital bus; and
   transmitting the address using an analog output signal in response to receiving the request to arbitrate for the address, including modulating a signal level of the analog output signal based on the address,
   wherein modulating the signal level of the analog output signal includes setting the signal level of the analog output signal within a range up to a maximum analog signal level, including setting the signal level of the analog output signal to a fraction of the maximum analog signal level, wherein the fraction to which the signal level of the analog output signal is set corresponds to the address.

* * * * *